(12) United States Patent
Höykinpuro

(10) Patent No.: US 12,389,459 B2
(45) Date of Patent: Aug. 12, 2025

(54) ROOT SEQUENCE INDEX DETERMINATION BASED ON EXPECTED INTERFERENCE WITH OTHER CELLS

(71) Applicant: Elisa Oyj, Helsinki (FI)

(72) Inventor: Veijo Höykinpuro, Helsinki (FI)

( * ) Notice: Subject to any disclaimer, the term of this patent is extended or adjusted under 35 U.S.C. 154(b) by 0 days.

(21) Appl. No.: 18/861,892

(22) PCT Filed: May 3, 2023

(86) PCT No.: PCT/FI2023/050239
§ 371 (c)(1),
(2) Date: Oct. 31, 2024

(87) PCT Pub. No.: WO2023/218123
PCT Pub. Date: Nov. 16, 2023

(65) Prior Publication Data
US 2025/0176030 A1   May 29, 2025

(30) Foreign Application Priority Data

May 11, 2022 (FI) ...................................... 20225415

(51) Int. Cl.
*H04W 74/0833* (2024.01)
*H04W 74/00* (2009.01)
(52) U.S. Cl.
CPC ..... *H04W 74/0833* (2013.01); *H04W 74/004* (2013.01)
(58) Field of Classification Search
CPC ......................... H04W 74/0833; H04W 74/004
See application file for complete search history.

(56) References Cited

U.S. PATENT DOCUMENTS 11,202,210 B2   12/2021   Yuan et al.
11,240,689 B1   2/2022   Shankaranarayanan et al.
(Continued)

FOREIGN PATENT DOCUMENTS

EP     3573400 A1    11/2019
WO  2021038270 A1    3/2021

OTHER PUBLICATIONS

International Preliminary Report on Patentability and Written Opinion for International Application No. PCT/FI2023/050239, mailing date of Jun. 22, 2023.

*Primary Examiner* — Siren Wei
(74) *Attorney, Agent, or Firm* — FRESH IP PLC; Michael H. Anderson

(57) ABSTRACT

The present disclosure generally relates to determining root sequence indices (RSI) for a cell. Specifically disclosed herein is a computer-implemented method that may include: obtaining a first set of $N_1$ RSIs allocated to a first cell; obtaining a plurality of RSI sets allocated to a plurality of second cells; determining an RSI conflict; determining a conflict rank for the plurality of second cells, where the conflict rank is indicative of a level of expected interference with the first cell; determining a plurality of RSI lists associated with the plurality of second cells; selecting an RSI list, which is indicative of a set of $N_1$ RSIs not allocated to any of the plurality of second cells, and which is associated with a cell having a conflict rank indicative of a lowest level of expected interference; and allocating the set of $N_1$ RSIs not allocated to any of the plurality of second cells to the first cell.

14 Claims, 5 Drawing Sheets

(56) References Cited

U.S. PATENT DOCUMENTS

| | | | |
|---|---|---|---|
| 2011/0039567 A1* | 2/2011 | Lee | H04W 74/085 |
| | | | 455/450 |
| 2012/0046065 A1* | 2/2012 | Amirijoo | H04W 16/10 |
| | | | 455/524 |
| 2013/0039195 A1* | 2/2013 | Weng | H04W 48/20 |
| | | | 370/252 |
| 2014/0211606 A1 | 7/2014 | Bergman et al. | |
| 2014/0348121 A1 | 11/2014 | Su et al. | |

* cited by examiner

ROOT SEQUENCE INDEX DETERMINATION BASED ON EXPECTED INTERFERENCE WITH OTHER CELLS

CROSS-REFERENCE TO RELATED APPLICATION

This application is a National Phase entry of International Application No. PCT/FI2023/050239 under § 371 and claims the benefit of Finnish Patent Application No. FI20225415, filed May 11, 2022, which is hereby incorporated by reference in its entirety.

FIELD OF THE DISCLOSURE

The present disclosure generally relates to the field of wireless communications. Some example embodiments relate to determining root sequence indices for a cell based on expected interference with other cells.

BACKGROUND

A random access procedure may be used by user equipment (UE) to access a wireless communication network. The random access procedure may include transmission of a random access preamble comprising a preamble sequence identified by a root sequence index (RSI). Sets of RSIs may be allocated to cells of the network. It is however possible that RSIs conflict between different cells.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments of the present disclosure enable reduction of interference between random access signals of different cells. This benefit may be achieved by the features of the independent claims. Further example embodiments are provided in the dependent claims, the description, and the drawings.

According to a first aspect, a computer-implemented method comprises: obtaining a first set of $N_1$ root sequence indices allocated to a first cell of a wireless communication network, wherein the first set of $N_1$ root sequence indices defines a set of random access preamble sequences for accessing the first cell, and wherein $N_1$ is a number of root sequences allocated to the first cell; obtaining a plurality of second root sequence index sets allocated to a plurality of second cells of the wireless communication network; determining that at least one root sequence index of the first set of $N_1$ root sequence indices conflicts with at least one root sequence index of the plurality of second root sequence index sets; determining a conflict rank with respect to the first cell for each of the plurality of second cells, wherein the conflict rank is indicative of a level of expected interference with the first cell; determining a plurality of root sequence index lists associated with the plurality of second cells, wherein each root sequence index list is indicative of root sequence indices allocated to a particular cell of the plurality of second cells and root sequence indices allocated to other cells of the plurality of second cells for which the conflict rank is indicative of a higher level of expected interference, when compared to the particular cell; selecting a root sequence index list, which is indicative of a set of $N_1$ root sequence indices not allocated to any of the plurality of second cells, and which is associated with a cell having a conflict rank indicative of a lowest level of expected interference among cells associated with root sequence index lists indicative of any set of $N_1$ root sequence indices not allocated to the plurality of second cells; and allocating the set of $N_1$ root sequence indices not allocated to any of the plurality of second cells to the first cell.

According to an example embodiment of the first aspect, the method further comprises: determining the number of root sequence indices $N_1$ allocated to the first cell based on a range of the first cell or a physical random access channel cyclic shift configuration of the first cell.

According to an example embodiment of the first aspect, the first set of $N_1$ root sequence indices comprises a first contiguous set of $N_1$ root sequence indices, and wherein the first set of $N_1$ root sequence indices is determined based on a root sequence starting index of the first cell and the number of root sequences $N_1$ allocated to the first cell.

According to an example embodiment of the first aspect, the method further comprises: determining, for each k-th cell of the plurality of second cells, a number of root sequence indices $N_{2,k}$ allocated to the k-th cell based on a range of the k-th cell or a physical random access channel configuration of the k-th cell.

According to an example embodiment of the first aspect, a k-th root sequence index set of the plurality of second root sequence index sets comprises a second contiguous set of $N_{2,k}$ root sequence indices, and the k-th root sequence index set is determined based on a root sequence starting index of the k-th cell and the number of root sequence indices $N_{2,k}$ allocated to the k-th cell.

According to an example embodiment of the first aspect, the method further comprises: determining an upper root sequence index limit based on a sum of the root sequence starting index of the first cell and the number of root sequences $N_1$ allocated to the first cell; and for each k-th cell of the plurality of second cells: determining a lower root sequence index limit based on a subtraction of the root sequence starting index of the first cell and the number of root sequence indices $N_{2,k}$ allocated to the k-th cell, and determining that at least one root sequence index of the first set of $N_1$ root sequence indices conflicts with at least one root sequence index of the k-th root sequence index set, if the root sequence starting index of the k-th cell is higher than or equal to the lower root sequence index limit and lower than or equal to the upper root sequence index limit.

According to an example embodiment of the first aspect, the method further comprises: determining a level of expected interference between the first cell and the k-th cell based on a distance between access nodes of the first cell and the k-th cell and/or antenna angles of the first cell and the k-th cell.

According to an example embodiment of the first aspect, the number of root sequence indices $N_1$ allocated to the first cell is different from the number of root sequence indices $N_{2,k}$ allocated to the k-th cell for at least one k.

According to an example embodiment of the first aspect, the number of root sequence indices $N_{2,k}$ is different for at least two of the plurality of second cells.

According to an example embodiment of the first aspect, the method further comprises: determining the plurality of second cells based on at least one of: a threshold for the conflict rank or a threshold for a distance to the first cell.

According to an example embodiment of the first aspect, the method further comprises: determining the first cell based on a threshold for a random access success rate of the first cell.

According to an example embodiment of the first aspect, the method further comprises: iteratively determining and allocating sets of root sequence indices to a plurality of the first cells.

According to a second aspect, an apparatus comprises means for performing any example embodiment of the method of the first aspect.

According to a third aspect, computer program or a computer program product comprises program code configured to, when executed by a processor, cause an apparatus at least to perform any example embodiment of the method of the first aspect.

According to a fourth aspect, an apparatus comprises at least one processor; and at least one memory including computer program code; the at least one memory and the computer code configured to, with the at least one processor, cause the apparatus at least to perform any example embodiment of the method of the first aspect.

Any example embodiment may be combined with one or more other example embodiments. Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, a computer-implemented method may comprise: obtaining a first set of $N_1$ RSIs allocated to a first cell; obtaining a plurality of RSI sets allocated to a plurality of second cells; determining an RSI conflict; determining a conflict rank for the plurality of second cells, wherein the conflict rank is indicative of a level of expected interference with the first cell; determining a plurality of RSI lists associated with the plurality of second cells; selecting an RSI list, which is indicative of a set of $N_1$ RSIs not allocated to any of the plurality of second cells, and which is associated with a cell having a conflict rank indicative of a lowest level of expected interference; and allocating the set of $N_1$ RSIs not allocated to any of the plurality of second cells to the first cell.

Figure 1:
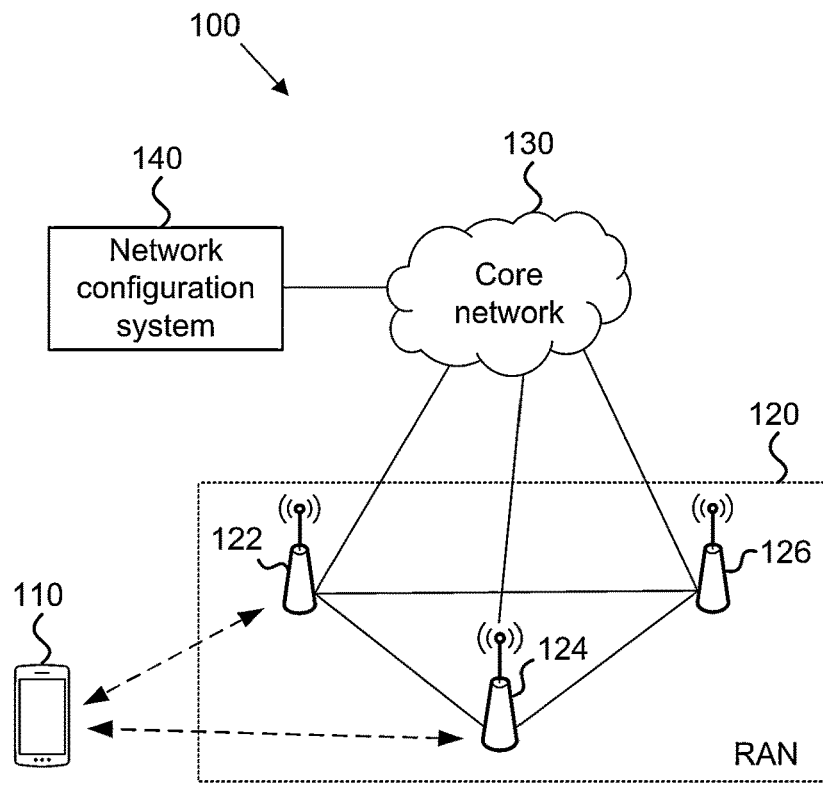
FIG. 1 illustrates an example of a wireless communication network.

FIG. 1 illustrates an example of a wireless communication network. Communication network 100 may comprise one or more devices, which may be also referred to as client nodes, user nodes, or user equipment (UE). An example of a device is UE 110, which may communicate with one or more access nodes of a radio access network (RAN) 120. An access node may be also referred to as an access point or a base station. Communication network 100 may be configured for example in accordance with the $4^{th}$ or $5^{th}$ generation (4G, 5G) digital cellular communication networks, as defined by the $3^{rd}$ Generation Partnership Project (3GPP). In one example, communication network 100 may operate according to 3GPP (4G) LTE (Long-Term Evolution) or 3GPP 5G NR (New Radio). It is however appreciated that example embodiments presented herein are not limited to these example networks and may be applied in any present or future wireless communication networks, or combinations thereof, for example other type of cellular networks, short-range wireless networks, multicast networks, or the like. Access nodes 122, 124, 126 of RAN 120 may for example comprise $5^{th}$ generation access nodes (gNB) or $4^{th}$ generation access nodes (eNodeB). Communications between UE 110 and access nodes 122, 124, 126 may be bidirectional and hence any of these entities may be configured to operate as a transmitter, and/or a receiver.

An access node may provide communication services within one or more cells, which may correspond to geographical area(s) covered by signals transmitted by the access node. A random access (RA) procedure may be used by UE 110 to achieve uplink synchronization with an access node and to obtain transmission resources for a radio resource control (RRC) connection. When UE 110 determines to connect to communication network 100, UE 110 may transmit a random access preamble that informs the network about the random access request and enables the access node of the respective cell to estimate the delay between UE 110 and the access node.

For example, in case of LTE, 64 different preamble sequences may be allocated to a cell. The preamble sequences may be shared among UEs, for example for initial access at that cell or handover from other cells. Parameters for generating the preamble sequences may be provided to UE 110 by the network, for example broadcast by access point 122 in system information of the cell, for example system information block 2 (SIB2).

Preamble sequences may be generated based on the RSI. For example, RSI may be used by UE 110 to determine which preamble sequence to use to generate a random access preamble. If multiple cells have the same RSI, an access node may receive false preambles from UEs trying to connect to an adjacent cell. This may be problematic for example when load of the random access is high. This may result is failures in RRC connection set-ups and handovers, which may negatively affect performance of the network, for example in terms of one or more key performance indicators (KPI).

Communication network 100 may further comprise a core network 130, which may comprise various network functions (NF) for establishing, configuring, and controlling data communication sessions of UE 110. The communication network may further comprise a network configuration system 140, which may be responsible of configuring various operations of RAN 120 and/or core network 130. Even though illustrated as a separate entity, network configuration system 140 may be also embodied as part of core network 130. Even though some operations have been described as being performed by network configuration system 140, it is understood that similar functions may be performed alternatively by other network device or network function of communication network 100.

Figure 2:
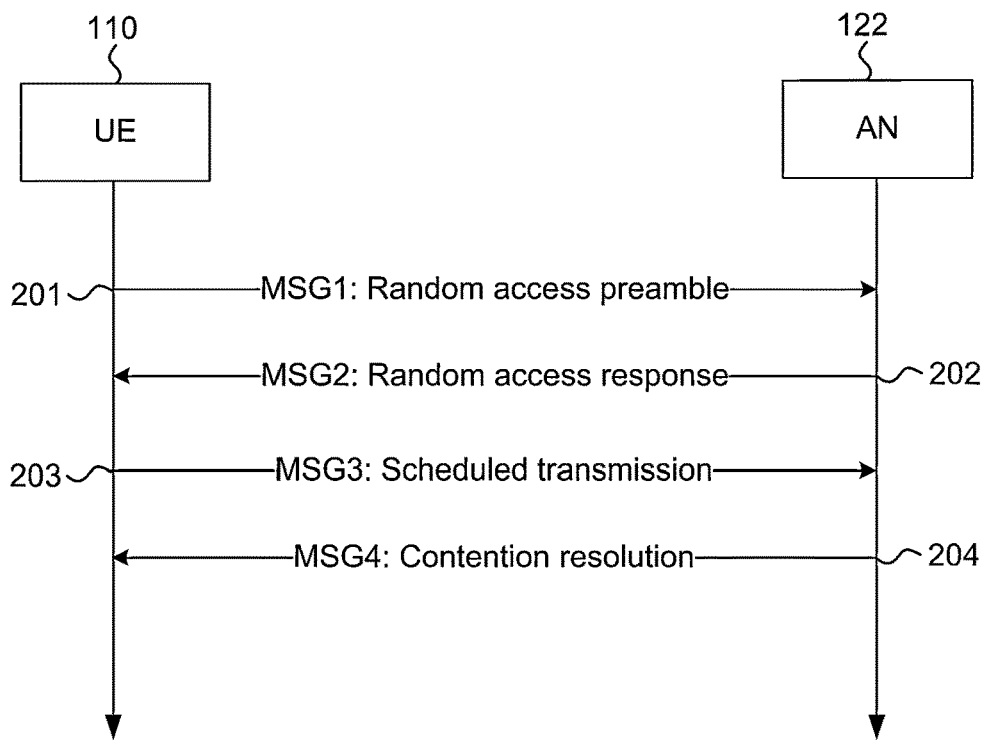
FIG. 2 illustrates an example of a random access procedure.

FIG. 2 illustrates an example of a random access procedure. This example is related to a four-step random access procedure, but it is noted that example embodiments may be generally applied to any random access procedure including transmission of a preamble sequence.

At operation 201, UE 110 may transmit a random access (RA) preamble. The RA preamble may comprise a first message (MSG1). MSG1 may be also called a random access request. The RA preamble may be transmitted on a physical random access channel (PRACH). The preamble sequence may comprise a set of complex-valued symbols, for example a Zadoff-Chu sequence, with a particular cyclic shift. The number of preambles that can be generated by one root sequence (RS) may be determined by the size of the cyclic shift. In case of LTE there may be 838 available RSI values and the number of available unique (i.e. non-conflicting) RSI values may depend on the cyclic shift. One cell may therefore reserve 1 to 64 RSI values, depending on the cyclic shift.

Access node (AN) 122 may receive the RA preamble from UE 110. After transmission of the RA preamble, the UE 110 may initiate monitoring for a response, for example on a physical downlink control channel (PDCCH).

At operation 402, access node 122 may transmit a random access (RA) response. The RA response may comprise a second message (MSG2). The RA response may comprise an identifier of the RA preamble received by access node 122 at operation 201. In response to receiving an RA response comprising the identifier of the RA preamble transmitted at operation 201, UE 110 may determine the RA response to be successful and proceed to transmitting a scheduled uplink transmission at operation 203. In response to not receiving an RA response, for example within a configured RA response window, or failing to verify the RA response, UE 110 may determine that the RA response has failed. In this case, the UE 110 may determine to try random access again or determine the RA procedure to have failed.

The RA response may indicate to the UE 110, which uplink resources it can use to perform its uplink transmission of following message(s) to access node 122. The RA response may further comprise an indication of a timing advance to be applied for adjusting the transmit timing of the UE 110, for example as a timing advance command (TAC).

At operation 203, UE 110 may transmit a scheduled transmission. The scheduled (uplink) transmission may comprise a third message (MSG3). UE 110 may adjust transmission time of the scheduled transmission based on the indication of the timing advance received at operation 202. This enables to ensure that the scheduled transmission is aligned with uplink signals from other UEs and thereby to maintain orthogonality between the signals received at access node 122, even with a relatively short cyclic prefix of the scheduled transmission.

At operation 204, access node 122 may transmit a contention resolution message. The contention resolution may comprise a fourth message (MSG4). The contention resolution message may be transmitted on the PDCCH or a physical downlink shared channel (PDSCH). UE 110 may determine contention resolution to be successful, in response to receiving a contention resolution message addressed to the UE 110, for example, by a particular value of the cell radio network temporary identifier (C-RNTI).

In case of LTE, the cell range (i.e. the maximum distance from access node 122 at which UE 110 is able to connect to the cell) may depend on the cyclic shift configuration. This is because at some distance the delay between UE 110 and access node 122 causes ambiguity for the preamble sequence due to the cyclic shift. The index of cyclic shift configuration, as well as the associated number of preambles per root sequence, number of root sequences per cell, and cell range, are listed in Table 1. The index of PRACH cyclic shift configuration may also indicate the number of cyclic shifts ($N_{CS}$) applicable for that configuration.

TABLE 1

| PRACH cyclic shift configuration | Preambles per root sequence | Number of root sequences per cell | Cell range (km) |
| --- | --- | --- | --- |
| 1 | 64 | 1 | 0.76 |
| 2 | 55 | 2 | 1.04 |
| 3 | 46 | 2 | 1.47 |
| 4 | 38 | 2 | 2.04 |
| 5 | 32 | 2 | 2.62 |
| 6 | 26 | 3 | 3.48 |
| 7 | 22 | 3 | 4.33 |
| 8 | 18 | 4 | 5.48 |
| 9 | 14 | 5 | 7.34 |
| 10 | 11 | 6 | 9.77 |
| 11 | 9 | 8 | 12.2 |
| 12 | 7 | 10 | 15.92 |
| 13 | 5 | 13 | 22.78 |
| 14 | 3 | 22 | 38.8 |
| 15 | 2 | 32 | 58.83 |
| 0 | 1 | 64 | 118.9 |

As can be observed from the above table, the number of non-conflicting RSI values decreases as the cell range increases.

In 5G NR, usage of RSI (for a particular cyclic shift configuration) may be different for example due to different preamble size. However, even though some example embodiments have been described using LTE as an example, it is appreciated that the example embodiments may be applied also with other systems, for example 5G NR or 6G.

One approach for RSI optimisation could be to allocate RSIs based on the assumption of having a similar cell range at a frequency band. For example, if cell range is 15 km, according to Table 1 each cell may be allocated a set of ten RSIs. Furthermore, there may be 838/10=83 unique RSI values in use. If there is a need to increase the cell range up to 35 km for some cell in the area, the RSIs may need to be allocated based on the cell range of that cell. In this case, there may be only 838/22=38 unique RSIs in use. Hence, allocating new RSI value(s) may be much harder.

It may be therefore desired to improve RSI utilization in case of a network layout with variable cell range. Example embodiments of the present disclosure enable identifying RSI conflicts between cells and determining optimal new RSI allocation, even if there were several different cell range values in use at the same frequency band. This also enables optimization of the cell range. The methods described herein may comprise conflict detection and conflict resolution, as will be further described with reference to FIG. 3 and FIG. 4.

Figure 3:
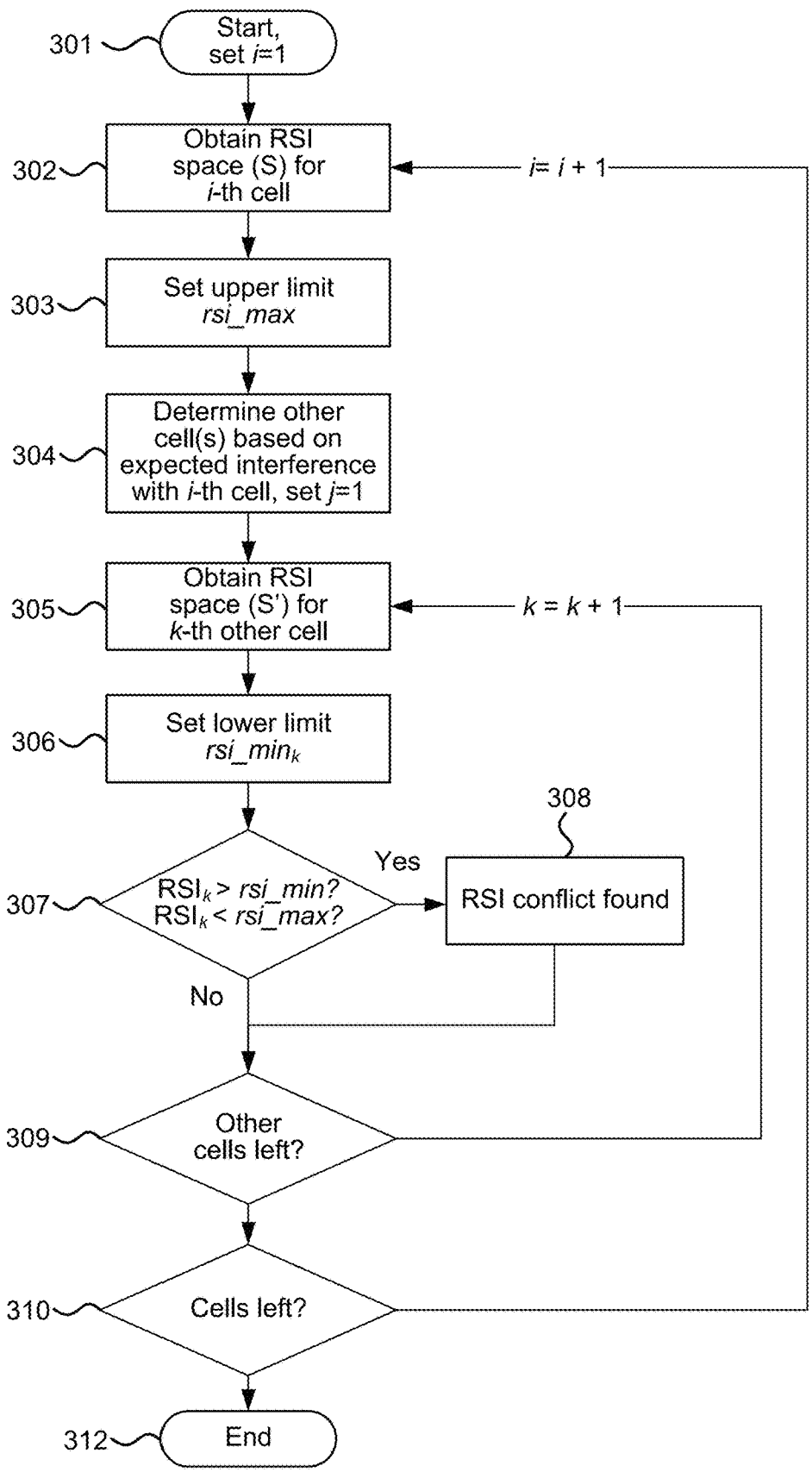
FIG. 3 illustrates an example of a method for detecting RSI conflicts.

FIG. 3 illustrates an example of a method for detecting RSI conflicts between cells. This operation may be performed to iterate over cell(s) of the network, indexed with i. A cell being iterated at the outer loop with index i may called a first cell or a source cell. For each first cell, one or more other cells, which may be also referred to as second cell(s), may be determined, for example based on expected interference to the first cell in question. The other cell(s) may be iterated at the inner loop with index k. The method may be performed by network configuration system 140, or in general any suitable network device or network function of communication network 100.

At operation 301, the procedure may be started. Index i may be set to one. Information for the cell(s) in scope of the outer loop, i.e. first cell(s), may be fetched. This information may include relevant PRACH parameters, such as for example one or more parameters of Table 1. The first cell(s) may be determined based on a threshold for a random access success rate. For example, if a random access success rate of a cell is lower than (or equal to) the threshold, the cell may be iterated at the outer loop. If the random access success rate of the cell is higher than (or equal to) the threshold, the cell may be omitted and not included in the set of cells iterated at the outer loop. This enables to optimise RSI conflict detection such that cells performing sufficiently well in terms of random access success rate are omitted, thereby reducing complexity and power consumption.

At operation 302, network configuration system 140 may obtain an RSI space for the i-th cell. The RSI space may be denoted by S (or $S_i$) and it may comprise $N_{1,i}$ RSIs allocated to the i-th cell. $N_{1,i}$ may be a positive integer. The set of $N_{1,i}$ root sequence indices may define a set of random access preamble sequences for accessing the i-th cell. The RSI space may comprise a contiguous range of RSIs and be therefore defined by an RSI starting index and the number of RSIs ($N_{1,i}$). Note that the number of RSIs may be different for the cell(s) iterated at the outer loop.

The RSI space may be obtained by retrieving this information from a memory of network configuration system 140, by receiving it from another network device, or determining the RSI space based on preamble configuration of the i-th cell. Even though some example embodiments have been described with reference to a contiguous RSI range, it is also possible to use other type of RSI allocations.

Network configuration system 140 may determine the number of root sequences $N_{1,i}$ allocated to the i-th cell based on its cell range or a PRACH cyclic shift configuration, e.g. in order to generate the set of RA preamble sequences available for accessing the i-th cell by a UE. The PRACH cyclic shift configuration may be indicated by an index (cf. Table 1). Each index may be associated with a certain number of cyclic shifts. In the example of Table 1, the PRACH cyclic shift configuration index directly indicates the number of cyclic shifts for that configuration. The number of RSIs may be determined based on Table 1. For example, if cell range of the i-th cell is 12 km, network configuration system 140 may determine that the number of root sequences per cell is eight. If the i-th cell uses PRACH configuration #4, network configuration system 140 may determine that the number of root sequences per cell is two. Network configuration system 140 may therefore operate without considering the number of preambles per root sequence (Table 1, second column). In some example embodiments, network configuration system 140 may not store entire Table 1. Network configuration system 140 may for example store a subset of Table 1 comprising the third column ("Number of root sequences per cell") and fourth column ("Cell range") and determine the number of root sequences based on the cell range. If network configuration system 140 determines the number of root sequences per cell based on the PRACH cyclic shift configuration, a subset comprising the first and third columns of Table 1 may be stored. In general, network configuration system 140 may store a mapping between the cell range and the number of root sequences per cell and/or a mapping between the PRACH cyclic shift configuration index and the number of root sequences per cell.

At operation 303, network configuration system 140 may set an upper RSI limit (rsi_max) for detecting an RSI conflict with the i-th cell. The upper RSI limit may be determined based on, or by, a sum of the RS starting index of the i-th cell and the number of RSIs ($N_{1,i}$) allocated to the i-th cell. The upper RSI limit enables to detect whether the RS starting index of another cell is within the RSI space S of the i-th cell, thereby creating an RSI conflict.

At operation 304, network configuration system 140 may determine other cell(s), which may be also referred to as second cell(s), to be considered for RSI conflict detection for the i-th cell. Index k of the inner loop may be set to one. The other cell(s) may be determined based on expected level of interference with the i-th cell. The level of interference may be estimated for example based on distance between the i-th cell and the other cell and/or antenna directions of the i-th cell and the other cell. For example, a threshold may be set for the distance to the i-th cell and used to determine the other cell(s). Cell(s) within this distance threshold may be iterated at the inner loop.

Antenna angle of the other cell(s) may be considered for example by determining a weight factor indicative of the expected level of interference between the i-th cell and the other cell. The weight factor may comprise a distance factor, which may be determined for the cells of the cell pair including the i-th cell and the other cell. The distance factor may indicate how far from each other the cells are. For this purpose coordinates (e.g. latitude, longitude) of the respective access nodes may be fetched, for example from a database, and the distance between the access nodes may be calculated on based on the coordinates.

The weight factor may further comprise an angle factor, which may be determined for the cells of the cell pair. The angle factor may indicate how perpendicularly the antennas of the access nodes of the cells are directed towards each other.

The weight factor (cost) may be determined for the cells of the cell pair for example based on the distance factor, the angle factor, and a predefined exponential function. The exponential function may comprise a product of two exponential functions, for example as follows:

$$\mathrm{cost} = e^{-\alpha * D} * e^{-\beta * d * D},$$

where D is the distance between the cells (distance factor), d is the angle factor determined based on antenna directions of the cells, and α and β are coefficients of the model, which enable to weight importance of the distance (α) and the antenna directions (β). A threshold may be then set for the weight factor. Cell(s) having a weight factor higher than (or equal to) the threshold may be considered at the inner loop (indexed by k).

Network configuration system 140 may determine a conflict rank for the other cell(s). The conflict rank may be determined based on level of expected interference, for example based on the distance(s) between the i-th cell and the other cell(s) or the weight factor(s) of the other cell(s) with respect to the i-th cell. The conflict rank may be therefore indicative of a ranking of the level of expected interference with the i-th cell among the level(s) of expected interference of the other cell(s) iterated at the inner loop. The conflict rank may for example comprise an integer value indicative of an order or ranking of a cell among the other cell(s), where the cell(s) are ordered in an increasing or decreasing level of expected interference with the i-th cell. For example, conflict rank "1" may indicate that the highest level of interference is expected to occur between the associated cell and the i-th cell. Conflict rank "2" may indicate that the second highest level of interference is expected to occur between the associated cell and the i-th cell. A threshold may be set for the conflict rank and only cells having a conflict rank indicative of a higher (or equal) level of expected interference may be included in the set of other cell(s) iterated at the inner loop.

At operation 305, network configuration system 140 may obtain an RSI space for the k-th other cell. The RSI space may be denoted by S' and it may comprise $N_{2,k}$ RSIs allocated to the k-th cell of the other cell(s). As noted above, the other cell(s) may be selected based on their expected interference level with the i-th cell. $N_{2,k}$ could be therefore alternatively denoted by $N_{2,i,k}$. The set of $N_{2,k}$ root sequence indices may define a set of random access preamble sequences for accessing the k-th cell. The number of RSIs may be different for the cell(s) iterated at the inner loop. The RSI space may be obtained by retrieving this information from a memory of network configuration system 140, by receiving it from another network device (for example any device responsible for configuration of the other cell(s)), or by determining the number of RSIs based on cell range or PRACH cyclic shift configuration of the k-th cell, as described for the i-th cell with reference to operation 302. Also RSI space S' may comprise a contiguous set of RSIs. RSI space S' may be therefore defined by an RSI starting index and the number of RSIs ($N_{2,k}$). The number of RSIs $N_{1,i}$ allocated to the i-th cell may be different from the number of RSIs $N_{2,k}$ allocated to the k-th cell, for example for one or more values of index k. It is also possible that the number of RSIs $N_{2,k}$ is different for two or more of the other cells considered at the inner loop, i.e., for two or more values of index k. This enables flexible network design with variable cell range and optimization of RSI allocation for that kind of network.

At operation 306, network configuration system 140 may set a lower RSI limit (rsi_min) for detecting RSI conflict with the i-th cell and the k-th other cell. The lower RSI limit may be therefore denoted by rsi_min$_k$. The lower RSI limit may be determined based on, or by, a subtraction of the RS starting index of the i-th cell and the number of RSIs ($N_{2,k}$) allocated to the k-th cell. The lower RSI limit enables to detect whether the RSI range of the k-th cell extends to overlap with the RS starting index of the i-th cell, thereby creating an RSI conflict.

At operation 307, network configuration system 140 may detect a conflict between RSIs of the i-th cell and the k-th other cell, e.g. by detecting at least one RSI value of the i-th cell to be common with the k-th other cell. Network configuration system 140 may for example detect that at least one RSI of the i-th cell conflicts with at least one RSI of the k-th other cell, if the RS starting index of the k-th cell (RSI$_k$) is higher than (or equal) to the lower RSI limit and lower than (or equal) to the upper RSI limit. If yes, network configuration system 140 may move to execution of operation 308. If not, network configuration system 140 may move to execution of operation 310.

At operation 308, network configuration system 140 may determine that least one RSI the set of $N_{1,i}$ root sequence indices allocated to the i-th cell conflicts with at least one RSI of the set of $N_{2,k}$ root sequence indices allocated to the k-th other cell. This may be in response to detecting the conflict at operation 307, for example based on the upper and lower RSI limits. After operation 308, network configuration server 140 may move to execution of operation 309.

At operation 309, network configuration system 140 may determine whether there are other cells left, e.g., whether index k has reached the number of other cells for the i-th cell. If not, iteration of the other cell(s) may be continued by moving back to execution of operation 305. Inner loop index k may be increased by one in this case. If there are no other cells left for the i-th cell, network configuration system 140 may move to execution of operation 310.

At operation 310, network configuration system 140 may determine whether the RSI conflict detection is to be performed for further cell(s) of the network. If yes, network configuration system 140 may select another "first cell" or "source cell" and perform the conflict detection for that cell. Outer loop index i may be increased by one. If not, the procedure may be ended at 312. It is however noted that RSI conflict detection may be performed for a single first cell, i.e., without iterating the outer loop.

As a numerical example, consider Cell A having RS starting index 30 and $N_{CS}$=12. It may be then determined based on Table 1 that Cell A needs 10 RSI values (S). The upper RSI limit may be therefore set to rsi_max=30+10=40. Other cells may be then determined based on the level of expected interference. In this example, a maximum number of other cells may be set to twenty (max_count<20). The other cells may be determined based on the conflict rank. The other cells may be then iterated, starting for example from the cell with conflict rank "1" (k=1). This cell may have RS starting index 1 (i.e. RSI$_1$=1) and $N_{CS}$=12. Since rsi_min$_1$=30−10=20, there is no RSI conflict because the RS starting index of this cell (RSI$_1$=1) is not between the lower and upper limits 20 and 40. The next cell (k=2) may have RSI$_2$=19 and $N_{CS}$=14. The lower limit is therefore rsi_min$_2$=30−22=8. Since the RS starting index of this cell (RSI$_2$=19) is between the lower and upper limits 8 and 40, there is a conflict. Similarly, conflicts may be determined for the rest of the (max. 20) other cells.

The procedure of FIG. 3 therefore enables to detect RSI conflicts between cells that may interfere with each other. Furthermore, the cells may be ranked with a conflict rank indicative of the level of expected interference. This facilitates improved RSI allocation (conflict resolution), as will be further described below.

Figure 4:
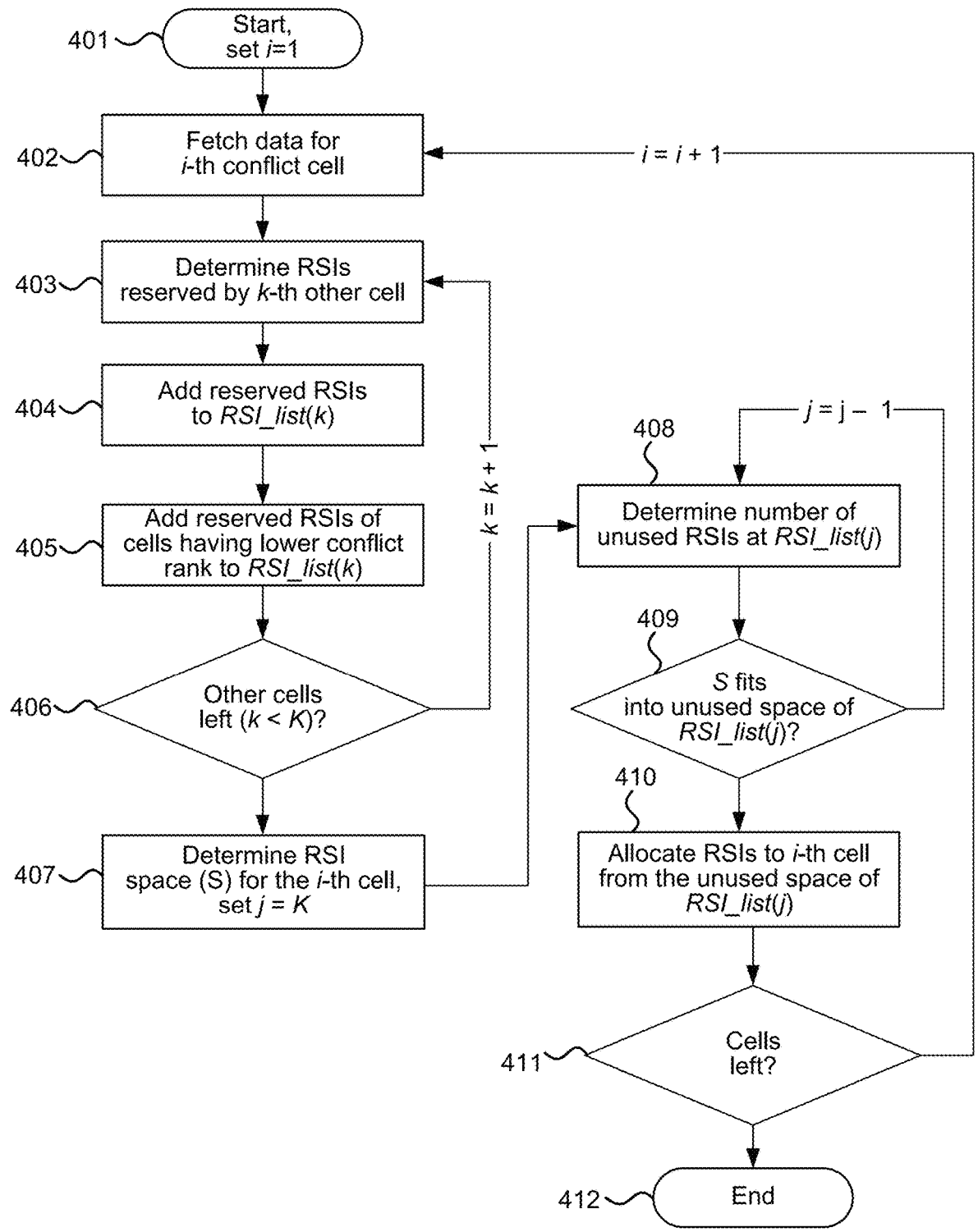
FIG. 4 illustrates an example of method for RSI conflict resolution.

FIG. 4 illustrates an example of method for RSI conflict resolution. In order to resolve the detected RSI conflicts, other cell(s) having same centre frequency as (or in general overlapping in frequency) the first cell may be considered. For example, max_count<resolve_rank (e.g. 100) of the other cells may be considered. The procedure may be iterated over the other cells at the first inner loop indexed with k. For a given other cell, a reserved RSI range (S') may be determined from Table 1 based on the PRACH cyclic shift configuration. The reserved RSIs and their ranking may be stored for each iterated cell, for example in a table. The reserved RSIs may be iterated at a second inner loop (indexed by j) in decreasing order of conflict rank and checked in order to identify sufficiently large unused (e.g. contiguous) spaces in the reserved RSIs. RSIs may be allocated to the first cell, if the RSI lists include a sufficiently large unused RSI space for allocating the RSI range S of the first cell. Similar to FIG. 3, the procedure may be iterated for a plurality of the first cells at the outer loop indexed with i.

At operation 401, the procedure may be started. Index i may be set to one.

At operation 402, network configuration system 140 may fetch information for the i-th cell. The cell(s) iterated at the outer loop (indexed with i) may comprise cell(s) for which an RSI conflict has been detected. The cell(s) in scope of the outer loop may be optionally determined based on a threshold for the random access success rate. For example, if a random access success rate of a cell is lower than (or equal to) the threshold, the cell may be considered at the outer loop. If the random access success rate of the cell is higher than (or equal to) the threshold, the cell may be omitted. This enables to optimise RSI conflict resolution such that cells performing sufficiently well in terms of random access success rate are omitted, thereby reducing complexity and power consumption. The threshold may or may not be different from the corresponding threshold used for determining the cell(s) for RSI conflict detection.

At operation 403, network configuration system 140 may determine the RSI space (S') reserved for a k-th other cell, similar to operation 305 or based on information obtained when performing operation 305 for the same cell. The other cell(s) may be iterated in the order of conflict rank at the first inner loop indexed by k. These cells may be iterated by starting from the cell being associated with the highest expected level of interference.

At operation 404, network configuration system 140 may add the reserved (allocated) RSIs determined at operation 403 to a k-th RSI list (RSI_list(k)). An RSI list may comprise for example a vector, whose elements represent the reserved RSIs. It is however noted an RSI list may be implemented in various ways. An RSI list may include the allocated RSIs. Alternatively, an RSI list may include unused (non-allocated) RSIs. In general, an RSI list may be indicative of the allocated and non-allocated RSIs.

At operation 405, network configuration system 140 may add to the k-th RSI list also the RSIs reserved for any previously iterated cells, that is, cells for which the conflict rank is indicative of a higher level of expected interference. The k-th RSI list may be therefore indicative of the RSIs allocated to any of other cells 1 to k. The k-th RSI list may therefore cumulatively represent the RSIs allocated to cells for which the expected level of interference is higher than a threshold, where the threshold is defined by the conflict rank of the k-th cell.

At operation 406, network configuration system 140 may determine whether other cells are left for the i-th cell, for example by determining whether the index k of the first inner loop has reached the number of other cells to be considered (K). If yes, iteration of the other cell(s) may be continued by increasing index k by one and moving back to execution of operation 403. As a result of iterating the first inner loop, network configuration system 140 may determine plurality of RSI lists associated with respective other cells. Each RSI list may be indicative of RSIs allocated to a particular one of the other cells and also RSIs allocated to other cells for which the conflict rank is indicative of a higher level of expected interference, when compared to the particular one of the other cells. If no further cells remain to be iterated at the first inner loop, network configuration system 140 may move to execution of operation 407.

At operation 407, network configuration system 140 may determine an RSI space for the i-th cell, similar to operation 302 or based on the information obtained when performing operation 302 for the same cell. Network configuration system 140 may also set index j to the number of other cells (K) iterated at the first inner loop, which may be equal to the number of RSI lists. Index j may be used to iterate the RSI lists starting from the RSI list of the cell having a conflict rank indicative of a lowest level of expected interference.

At operation 408, network configuration system 140 may determine a number of unused RSIs in RSI_list(j). If RSIs are allocated with contiguous ranges, network configuration system 140 may determine size(s) of contiguous set(s) of unused RSIs in RSI_list(j). Network configuration system 140 may for example determine the largest contiguous unused space at RSI_list(j) and the number of unused RSIs in that space.

At operation 409, network configuration system 140 may determine whether the RSI space of the i-th cell (i.e. the number of RSIs allocated to the i-th cell) fits into an unused space of RSI_list(j). If not, the RSI lists may be iterated by decreasing the value of j by one and moving back to execution of operation 408. If yes, network configuration system 140 may move to execution of operation 410.

At operation 410, network configuration system 140 may allocate new RSIs to the i-th cell from the unused space of RSI_list(j). Because the RSI lists are iterated at the second inner loop in the order of increasing level of expected interference, the network configuration system 140 may select an RSI list that includes a (contiguous) set of $N_{1,i}$ RSIs that 1) are not allocated to any other cell iterated at the first inner loop, and 2) which is associated with a cell having a conflict rank indicative of the lowest level of expected interference among cells associated with RSI lists comprising a (contiguous) set of $N_{1,i}$ unused root sequence indices (i.e. RSIs not allocated to the iterated other cells). As a result, in case an RSI conflict cannot be avoided, the RSI conflict is caused with a cell that has the lowest possible level of interference. This enables to reduce interference between RA preambles of different cells.

At operation 411, network configuration system 140 may determine whether conflict resolution is to be performed for further cell(s) of the network. If yes, network configuration system 140 may increase the outer loop index i by one, and initiate conflict resolution for another "first cell". Network configuration system 140 may therefore iteratively determine and allocate sets ($N_{1,i}$) RSIs to multiple first cells. The number of root sequences allocated may different for these cells. If there are no further cells to be iterated at the outer loop, the conflict resolution procedure may be ended at operation 412.

As a numerical example, conflict resolution may be performed for Cell A. Other cells having the same frequency may be first fetched (e.g. max_count<100 (resolve_rank)). Lists of reserved RSIs may be generated by iterating the other cells in decreasing order of conflict rank. For example, if Cell B with conflict_rank=rank1 (highest conflict rank) has RS starting index 1 and $N_{CS}$=12, Cell B may be determined to reserve RSIs from 1 to 10. These reserved RSIs may be added to a respective list, that is reserved_rsis [rank1]=[1, 2, 3, 4, 5, 6, 7, 8, 9, 10]. At the next iteration, if Cell B with conflict_rank=rank2 (second highest conflict rank) has RS starting index 19 and $N_{CS}$=14, Cell B may be determined to reserve RSIs from 19 to 40. These reserved RSIs may be added to a respective list (rank2), along with the RSIs included in the previous list(s), in this example reserved_rsis[rank1]. Hence, the RSI list associated with Cell C maybe given by reserved_rsis[rank2]=[1, 2, 3, 4, 5, 6, 7, 8, 9, 10, 19, 20, 21, 22, 23, 24, 25, 26, 27, 28, 29, 30, 31, 32, 33, 34, 35, 36, 37, 38, 39, 40]. Continuing this procedure with the same logic results in a set of RSI lists corresponding to respective conflict rank values.

From these lists, unused RSIs may be determined and an RSI space may be allocated to Cell A from a list that has be lowest conflict rank (i.e. lowest level of expected interference to Cell A). The lists of reserved RSIs may be iterated in increasing order of conflict rank, starting from the lowest conflict rank, in this example conflict_rank=100. This list may be given by reserved_rsis[rank100]=[1, 2, 3, 4, 5, 6, 7, 8, 9, 10, 19, 20, 21, 22, 23, . . . , 830, 831, 832]. Network configuration system 140 may check whether a set of ten consecutive unused values can be found at the list. If not, network configuration system 140 may iterate next rank level (reserved_rsis[rank99]=[ . . . 230, 232, 250, 252 . . . ]) and check whether there a set of ten consecutive unused RSI values can be found there. Because an unused RSI space of ten RSIs is found at this list (between 232 and 250), network configuration system 140 may allocate this space to Cell A. For example, set the new RS starting index of Cell A to 232.

Figure 5:
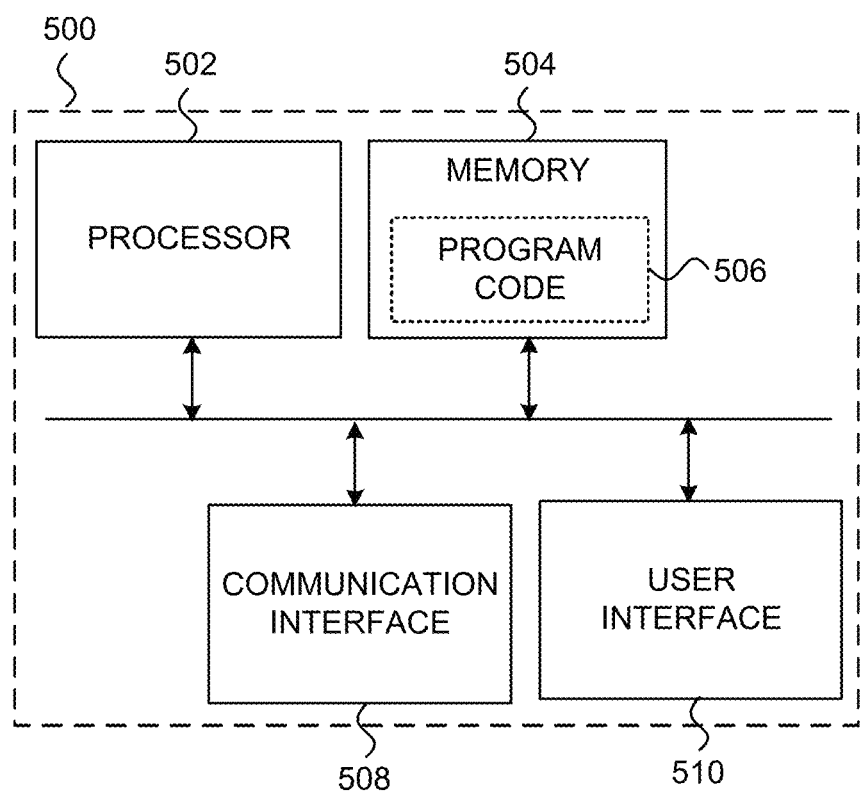
FIG. 5 illustrates an example of an apparatus configured to practise one or more example embodiments.

FIG. 5 illustrates an example embodiment of an apparatus 500, for example a server, configured to perform one or more example embodiments. Apparatus 500 may be for example used to implement network automation system 140. Apparatus 500 may comprise at least one processor 502. The at least one processor 502 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 500 may further comprise at least one memory 504. The at least one memory 504 may be configured to store, for example, computer program code or the like, for example operating system software and application software. The at least one memory 504 may comprise one or more volatile memory devices, one or more non-volatile memory devices, and/or a combination thereof. For example, the at least one memory 504 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 500 may further comprise a communication interface 508 configured to enable apparatus 500 to transmit and/or receive information to/from other devices, functions, or entities. In one example, apparatus 500 may use communication interface 508 to transmit or receive information over a service based interface (SBI) message bus of core network 130.

When apparatus 500 is configured to implement some functionality, some component and/or components of apparatus 500, such as for example the at least one processor 502 and/or the at least one memory 504, may be configured to implement this functionality. Furthermore, when the at least one processor 502 is configured to implement some functionality, this functionality may be implemented using program code 506 comprised, for example, in the at least one memory 504.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 500 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 500 comprises means for performing at least one method described herein. In one example, the means comprises the at least one processor 502, the at least one memory 504 including program code 506 configured to, when executed by the at least one processor, cause the apparatus 500 to perform the method.

Apparatus 500 may comprise a computing device such as for example an access point, a base station, a server, a network device, a network function device, or the like. Although apparatus 500 is illustrated as a single device it is appreciated that, wherever applicable, functions of apparatus 500 may be distributed to a plurality of devices, for example to implement example embodiments as a cloud computing service.

Figure 6:
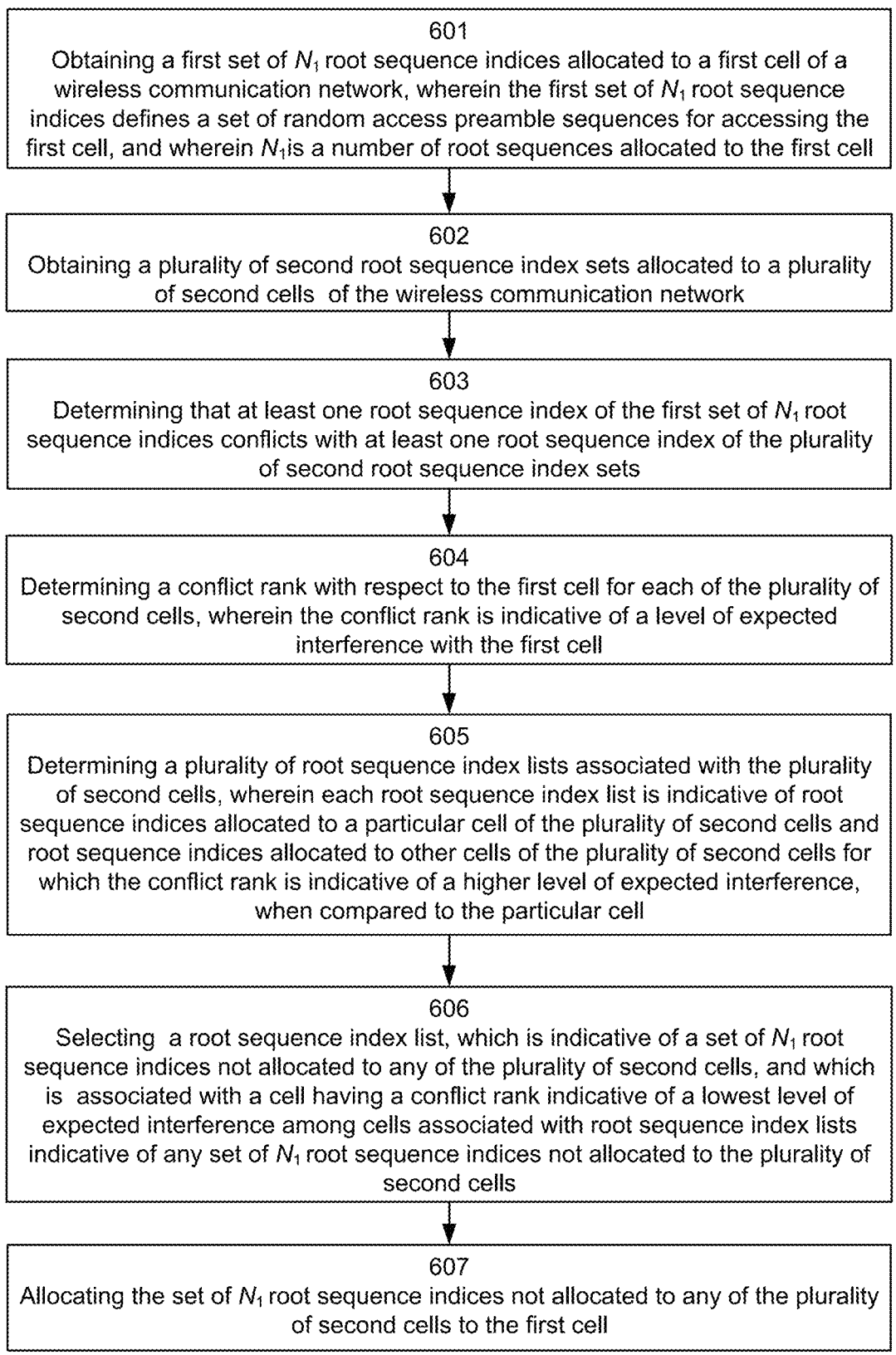
FIG. 6 illustrates an example of a method for allocating root sequence indices in a wireless communication network.

FIG. 6 illustrates an example of a computer-implemented method for allocating root sequence indices in a wireless communication network.

At 601, the method may comprise obtaining a first set of N1 root sequence indices allocated to a first cell of a wireless communication network, wherein the first set of N1 root sequence indices defines a set of random access preamble sequences for accessing the first cell, and wherein N1 is a number of root sequences allocated to the first cell.

At 602, the method may comprise obtaining a plurality of second root sequence index sets allocated to a plurality of second cells of the wireless communication network.

At 603, the method may comprise determining that at least one root sequence index of the first set of N1 root sequence indices conflicts with at least one root sequence index of the plurality of second root sequence index sets.

At 604, the method may comprise determining a conflict rank with respect to the first cell for each of the plurality of second cells, wherein the conflict rank is indicative of a level of expected interference with the first cell.

At 605, the method may comprise determining a plurality of root sequence index lists associated with the plurality of second cells, wherein each root sequence index list is indicative of root sequence indices allocated to a particular cell of the plurality of second cells and root sequence indices allocated to other cells of the plurality of second cells for which the conflict rank is indicative of a higher level of expected interference, when compared to the particular cell.

At 606, the method may comprise selecting a root sequence index list, which is indicative of a set of N1 root sequence indices not allocated to any of the plurality of second cells, and which is associated with a cell having a conflict rank indicative of a lowest level of expected interference among cells associated with root sequence index lists indicative of any set of N1 root sequence indices not allocated to the plurality of second cells.

At 607, the method may comprise allocating the set of N1 root sequence indices not allocated to any of the plurality of second cells to the first cell.

Further features of the method directly result for example from the functionalities of, as described throughout the specification and in the appended claims, and are therefore not repeated here. Different variations of the method may be also applied, as described in connection with the various example embodiments.

An apparatus, such as for example a network device configured to implement one or more network functions or entities, may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A computer-implemented method, comprising:
   obtaining a first set of $N_1$ root sequence indices allocated to a first cell of a wireless communication network, wherein the first set of $N_1$ root sequence indices defines a set of random access preamble sequences for accessing the first cell, and wherein $N_1$ is a number of root sequences allocated to the first cell;
   obtaining a plurality of second root sequence index sets allocated to a plurality of second cells of the wireless communication network;
   determining that at least one root sequence index of the first set of $N_1$ root sequence indices conflicts with at least one root sequence index of the plurality of second root sequence index sets;
   determining a conflict rank with respect to the first cell for each of the plurality of second cells, wherein the conflict rank is indicative of a level of expected interference with the first cell;
   determining a plurality of root sequence index lists associated with the plurality of second cells, wherein each root sequence index list is indicative of root sequence indices allocated to a particular cell of the plurality of second cells and root sequence indices allocated to other cells of the plurality of second cells for which the conflict rank is indicative of a higher level of expected interference, when compared to the particular cell;
   selecting a root sequence index list, which is indicative of a set of $N_1$ root sequence indices not allocated to any of the plurality of second cells, and which is associated with a cell having a conflict rank indicative of a lowest level of expected interference among cells associated with root sequence index lists indicative of any set of $N_1$ root sequence indices not allocated to the plurality of second cells; and
   allocating the set of $N_1$ root sequence indices not allocated to any of the plurality of second cells to the first cell.

2. The method according to claim 1, further comprising:
   determining the number of root sequence indices $N_1$ allocated to the first cell based on a range of the first cell or a physical random access channel cyclic shift configuration of the first cell.

3. The method according to claim 1, wherein the first set of $N_1$ root sequence indices comprises a first contiguous set of $N_1$ root sequence indices, and wherein the first set of $N_1$ root sequence indices is determined based on a root sequence starting index of the first cell and the number of root sequences $N_1$ allocated to the first cell.

4. The method according to claim 1, further comprising:
   determining, for each k-th cell of the plurality of second cells, a number of root sequence indices $N_{2,k}$ allocated to the k-th cell based on a range of the k-th cell or a physical random access channel configuration of the k-th cell.

5. The method according to claim 4, wherein a k-th root sequence index set of the plurality of second root sequence index sets comprises a second contiguous set of $N_{2,k}$ root sequence indices, and wherein the k-th root sequence index set is determined based on a root sequence starting index of the k-th cell and the number of root sequence indices $N_{2,k}$ allocated to the k-th cell.

6. The method according to claim 5, further comprising:
determining an upper root sequence index limit based on a sum of the root sequence starting index of the first cell and the number of root sequences $N_1$ allocated to the first cell; and
for each k-th cell of the plurality of second cells:
determining a lower root sequence index limit based on a subtraction of the root sequence starting index of the first cell and the number of root sequence indices $N_{2,k}$ allocated to the k-th cell, and
determining that at least one root sequence index of the first set of $N_1$ root sequence indices conflicts with at least one root sequence index of the k-th root sequence index set, if the root sequence starting index of the k-th cell is higher than or equal to the lower root sequence index limit and lower than or equal to the upper root sequence index limit.

7. The method according to claim 6, further comprising:
determining a level of expected interference between the first cell and the k-th cell based on a distance between access nodes of the first cell and the k-th cell and/or antenna angles of the first cell and the k-th cell.

8. The method according to claim 4, wherein the number of root sequence indices $N_1$ allocated to the first cell is different from the number of root sequence indices $N_{2,k}$ allocated to the k-th cell for at least one k.

9. The method according to claim 4, wherein the number of root sequence indices $N_{2,k}$ is different for at least two of the plurality of second cells.

10. The method according to claim 1, further comprising:
determining the plurality of second cells based on at least one of: a threshold for the conflict rank or a threshold for a distance to the first cell.

11. The method according to claim 1, further comprising:
determining the first cell based on a threshold for a random access success rate of the first cell.

12. The method according to claim 1, further comprising:
iteratively determining and allocating sets of root sequence indices to a plurality of the first cells.

13. An apparatus comprising:
means for performing a method comprising:
obtain a first set of $N_1$ root sequence indices allocated to a first cell of a wireless communication network, wherein the first set of $N_1$ root sequence indices defines a set of random access preamble sequences for accessing the first cell, and wherein $N_1$ is a number of root sequences allocated to the first cell;
obtain a plurality of second root sequence index sets allocated to a plurality of second cells of the wireless communication network;
determine that at least one root sequence index of the first set of $N_1$ root sequence indices conflicts with at least one root sequence index of the plurality of second root sequence index sets;
determine a conflict rank with respect to the first cell for each of the plurality of second cells, wherein the conflict rank is indicative of a level of expected interference with the first cell;

determine a plurality of root sequence index lists associated with the plurality of second cells, wherein each root sequence index list is indicative of root sequence indices allocated to a particular cell of the plurality of second cells and root sequence indices allocated to other cells of the plurality of second cells for which the conflict rank is indicative of a higher level of expected interference, when compared to the particular cell;
select a root sequence index list, which is indicative of a set of $N_1$ root sequence indices not allocated to any of the plurality of second cells, and which is associated with a cell having a conflict rank indicative of a lowest level of expected interference among cells associated with root sequence index lists indicative of any set of $N_1$ root sequence indices not allocated to the plurality of second cells; and
allocate the set of $N_1$ root sequence indices not allocated to any of the plurality of second cells to the first cell.

14. A computer program comprising a non-transitory computer-readable storage medium having instructions stored thereon that, when executed by a processor, cause an apparatus at least to:
obtain a first set of $N_1$ root sequence indices allocated to a first cell of a wireless communication network, wherein the first set of $N_1$ root sequence indices defines a set of random access preamble sequences for accessing the first cell, and wherein $N_1$ is a number of root sequences allocated to the first cell;
obtain a plurality of second root sequence index sets allocated to a plurality of second cells of the wireless communication network;
determine that at least one root sequence index of the first set of $N_1$ root sequence indices conflicts with at least one root sequence index of the plurality of second root sequence index sets;
determine a conflict rank with respect to the first cell for each of the plurality of second cells, wherein the conflict rank is indicative of a level of expected interference with the first cell;
determine a plurality of root sequence index lists associated with the plurality of second cells, wherein each root sequence index list is indicative of root sequence indices allocated to a particular cell of the plurality of second cells and root sequence indices allocated to other cells of the plurality of second cells for which the conflict rank is indicative of a higher level of expected interference, when compared to the particular cell;
select a root sequence index list, which is indicative of a set of $N_1$ root sequence indices not allocated to any of the plurality of second cells, and which is associated with a cell having a conflict rank indicative of a lowest level of expected interference among cells associated with root sequence index lists indicative of any set of $N_1$ root sequence indices not allocated to the plurality of second cells; and
allocate the set of $N_1$ root sequence indices not allocated to any of the plurality of second cells to the first cell.

* * * * *